B. L. PHILLIPS.
ANIMAL TRAP.
APPLICATION FILED SEPT. 16, 1916.

1,213,248.

Patented Jan. 23, 1917.

INVENTOR:
Bertram Lewis Phillips
BY Wm. Wallace White
ATT'Y

UNITED STATES PATENT OFFICE.

BERTRAM LEWIS PHILLIPS, OF BROCKLEY, LONDON, ENGLAND.

ANIMAL-TRAP.

1,213,248.  Specification of Letters Patent.  Patented Jan. 23, 1917.

Application filed September 16, 1916. Serial No. 120,434.

*To all whom it may concern:*

Be it known that I, BERTRAM LEWIS PHILLIPS, American citizen, residing at No. 94 Tressillian road, Brockley, London, England, have invented a new and useful Improved Animal-Trap, of which the following is a specification.

This invention relates to rat-traps and traps for other animals of the cage type, and consists in an improved mode of construction designed to increase the sensitiveness of the means for retaining the trap open, so that when the animal enters the trap and nibbles the bait the trap immediately closes.

In a trap constructed according to this invention, the cage is movable upon the floor thereof so that the front end can be held raised to provide an entrance, and this end of the cage is retained raised by means of a cord or the like led over a support and provided at its opposite end with a bait plate which is held frictionally between the rear end of the cage and the floor thereof. This bait plate is provided with means, for instance a hook, for the reception of the bait. When the bait is nibbled the plate becomes dislodged from beneath the edge of the cage, with the result that the front end of the cage drops closing the entrance to the trap.

Representative examples of traps constructed according to the present invention are illustrated on the accompanying drawings, in which:—

Figure 1:
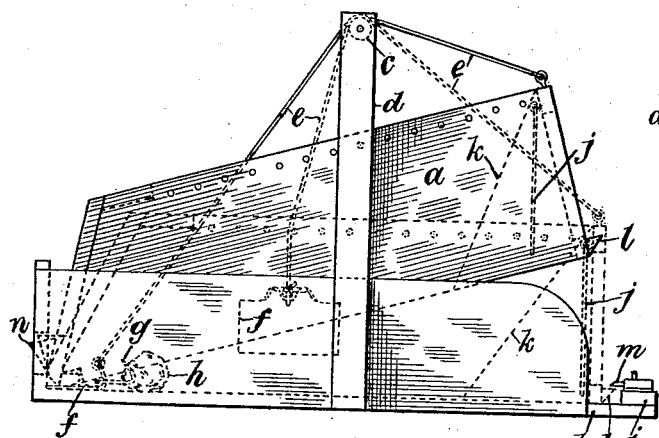
Figure 2:
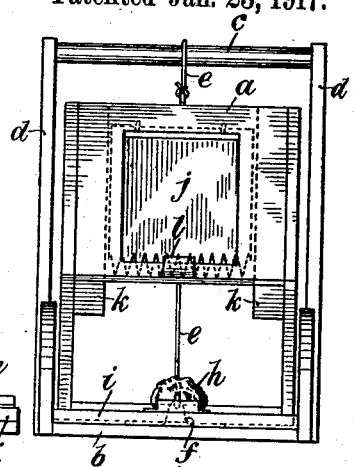
Figure 3:
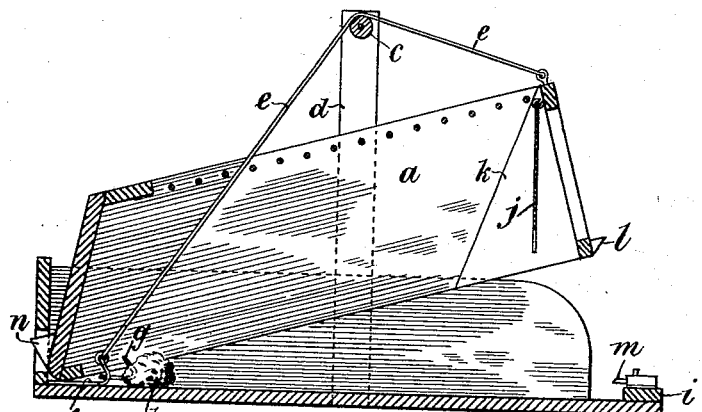
Figure 5:
Figure 4:
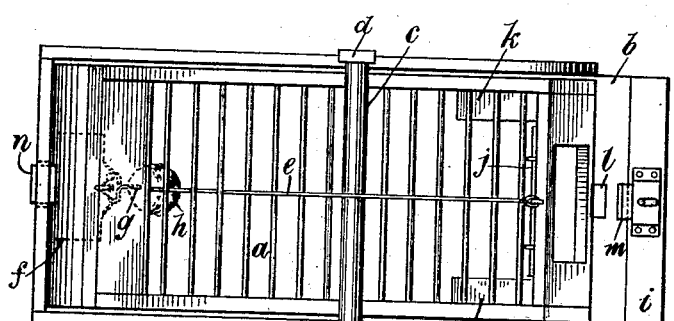

Figure 1 is a side elevation, Fig. 2 a front elevation, Fig. 3 a longitudinal section, and Fig. 4 a plan. Fig. 5 shows a detail of the bait plate. The trap consists of a cage $a$ closed on the top and on all sides but open at the bottom. The cage $a$ is situated on a base plate $b$ having upstanding walls at the back and sides but no wall at the front. At about the midlength of the base plate $b$ a horizontal bar $c$ is provided well above the upstanding side walls, and extending between and supported by two side posts $d, d$ secured to the side walls and base plate $b$. A cord or chain $e$ secured at one end to the front of the cage $a$ and to the other end of which a piece of tinplate $f$ is attached, is led over the horizontal bar $c$. The cord $e$ is of such length that when the piece of tinplate $f$ is inserted between the bottom edge of the rear of the cage $a$, the front end of the cage $a$ is raised as shown to provide an entrance into the cage $a$ for the animal to be trapped. A hook $g$ is provided on the piece of tinplate $f$ for the attachment of a bait $h$. On the animal nibbling the bait $h$, the piece of tinplate $f$ will become displaced from between the rear of the cage $a$ and the base plate $b$, thus releasing the cord $e$, whereupon the cage $a$ will fall by gravity into the position shown in dotted lines in Fig. 1, and inclose the animal on all sides.

$i$ is a fillet or ledge on the base plate $b$, provided to prevent the cage $a$ being displaced forwardly off the base plate by the entrapped animal.

An aperture of sufficient size for the ingress of a fellow animal attracted by the captive animal, is provided at the front of the cage $a$. This aperture has an inwardly opening flap door $j$ pivoted about its upper edge. The lower edge of the flap door $j$ is serrated to engage in the back of the animal entering the aperture and prevent the backward retreat thereof.

Wings $k$ are provided at the sides of the aperture to prevent an animal already in the cage $a$ from escaping while another animal is entering, or the flap door $j$ may be of the full interior width of the cage $a$ to serve the same purpose, as shown in plan in Fig. 6.

To set the trap the hook $g$ is baited and the front end of the cage $a$ is raised. The piece of tinplate $f$, or other metal, which is attached to the cord or chain $e$ is now inserted between the base plate $b$ and the rear end of the cage $a$. On freeing the front end of the cage $a$, this end of the cage $a$ is held upward by the cord $e$ owing to the piece of tinplate $f$ being retained between the rear end of the cage $a$ and the base plate $b$. In the event of the animal entering beneath the cage $a$ and nibbling the bait $h$, the piece of tinplate $f$ becomes displaced from between the edge of the cage $a$ and the base plate $b$, whereupon the raised end of the cage $a$ falls and thus closes the trap. The animal cannot get out of the trap but another may enter by way of the suspended flap door $j$ which opens inward. The lower edge of this door $j$ being serrated, such animal after partially entering the cage $a$ is prevented from retreating, the serrated edge of the door $j$ serving to arrest backward movement of the animal.

To prevent the cage $a$, when of light weight, from being lifted by the entrapped animal or animals, the front end of the cage $a$ may be provided with a bevel-nosed lug $l$ which is engaged by an inwardly directed spring-protruded latch $m$ on the fillet $i$ of the base plate $b$, and the rear end of the cage may be provided with a lug $n$ which is entered in a hole in the rear wall of the base plate $b$.

Although I have described a particular construction of trap for carrying out my invention, it will be understood that the construction may be modified and the size of the trap may be made to suit the animal to be caught without departing from the invention which consists in retaining in a raised position the entrance end of the cage with the aid of a cord or the like which is held by the opposite end of the cage.

I claim:

1. In an animal trap, an open bottomed but otherwise closed cage, a support above said cage, a bait plate and flexible connecting means between the front portion of said cage and said bait plate, led over said support and of such length that the front of said cage is raised when said bait plate is inserted beneath the rear edge of said cage.

2. In an animal trap, an open bottomed but otherwise closed cage, a base plate, upstanding side and rear walls and a front fillet on said base plate loosely inclosing said cage, a support above said cage, a bait plate and flexible connecting means between the front portion of said cage and said bait plate, led over said support and of such length that the front of said cage is raised when said bait plate is inserted between the rear edge of said cage and said base plate.

3. In an animal trap, an open bottomed but otherwise closed cage, a base plate, upstanding side and rear walls and a fillet on said base plate loosely inclosing said cage, a lug at the rear edge of said cage engaging in said rear wall, a lug at the front edge of said cage, an inwardly directed spring-protruded latch on said fillet, a support above said cage, a bait plate and flexible connecting means between the front portion of said cage and said bait plate, led over said support and of such length that the front of said cage is raised when said bait plate is inserted between the rear edge of said cage and said base plate.

In testimony whereof I have signed my name to this specification.

BERTRAM LEWIS PHILLIPS.

Copies of this patent may be obtained for five cents each, by addressing the "Commissioner of Patents, Washington, D. C."